United States Patent [19]
Kellerman et al.

[11] 3,945,478
[45] Mar. 23, 1976

[54] CENTRIFUGAL CLUTCH WITH ONE PIECE ROTOR

[75] Inventors: Rudolph Kellerman, Byram, Conn.; James L. Fischer, Bronxville, N.Y.

[73] Assignee: Textron Inc., Providence, R.I.

[22] Filed: Apr. 18, 1975

[21] Appl. No.: 569,451

Related U.S. Application Data

[63] Continuation-in-part of Ser. No. 462,179, April 18, 1974, abandoned.

[52] U.S. Cl. .................... 192/105 CD; 192/107 M
[51] Int. Cl.² ................... F16D 43/18; F16D 13/18
[58] Field of Search .... 192/105 CD, 105 BA, 103 B

[56] References Cited
UNITED STATES PATENTS

| | | | |
|---|---|---|---|
| 1,983,661 | 12/1934 | Frantz et al. ................. | 192/105 CD |
| 3,082,335 | 3/1963 | Lacey .......................... | 192/105 CD |
| 3,712,438 | 1/1973 | Roddy et al. ................. | 192/105 CD |
| 3,718,214 | 2/1973 | Newman ...................... | 192/105 CD |

FOREIGN PATENTS OR APPLICATIONS

| | | | |
|---|---|---|---|
| 404,162 | 10/1909 | France ......................... | 192/105 CD |
| 1,025,315 | 1/1953 | France ......................... | 192/105 CD |
| 1,035,480 | 7/1958 | Germany ...................... | 192/105 CD |

*Primary Examiner*—Benjamin W. Wyche
*Attorney, Agent, or Firm*—Robert E. Burns; Emmanuel J. Lobato; Bruce L. Adams

[57] ABSTRACT

A centrifugal clutch comprises a clutch drum and a one piece rotor of resilient material. The rotor has a central hub portion and two like weight portions on diametrically opposite sides of the hub. The weight portions are connected to the hub by integral curved spring portions which are relatively long so as to have a relatively low spring constant. The spring portions are of selected varying widths along their length so as to provide substantially equal fiber stress throughout the length of the spring portions when they flex under the action of centrifugal force on the weight portions to bring them into engagement with the inner surface of the drum and are subjected to driving force transmitted through the spring portions from the hub to the weight portions and hence to the drum.

11 Claims, 7 Drawing Figures

U.S. Patent   March 23, 1976   3,945,478
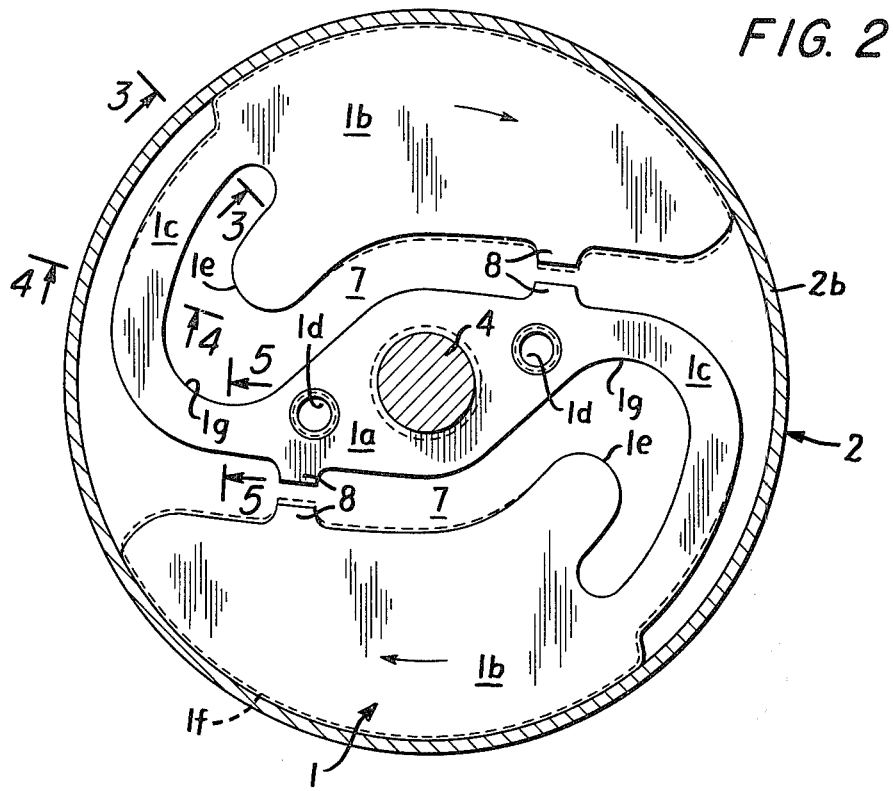
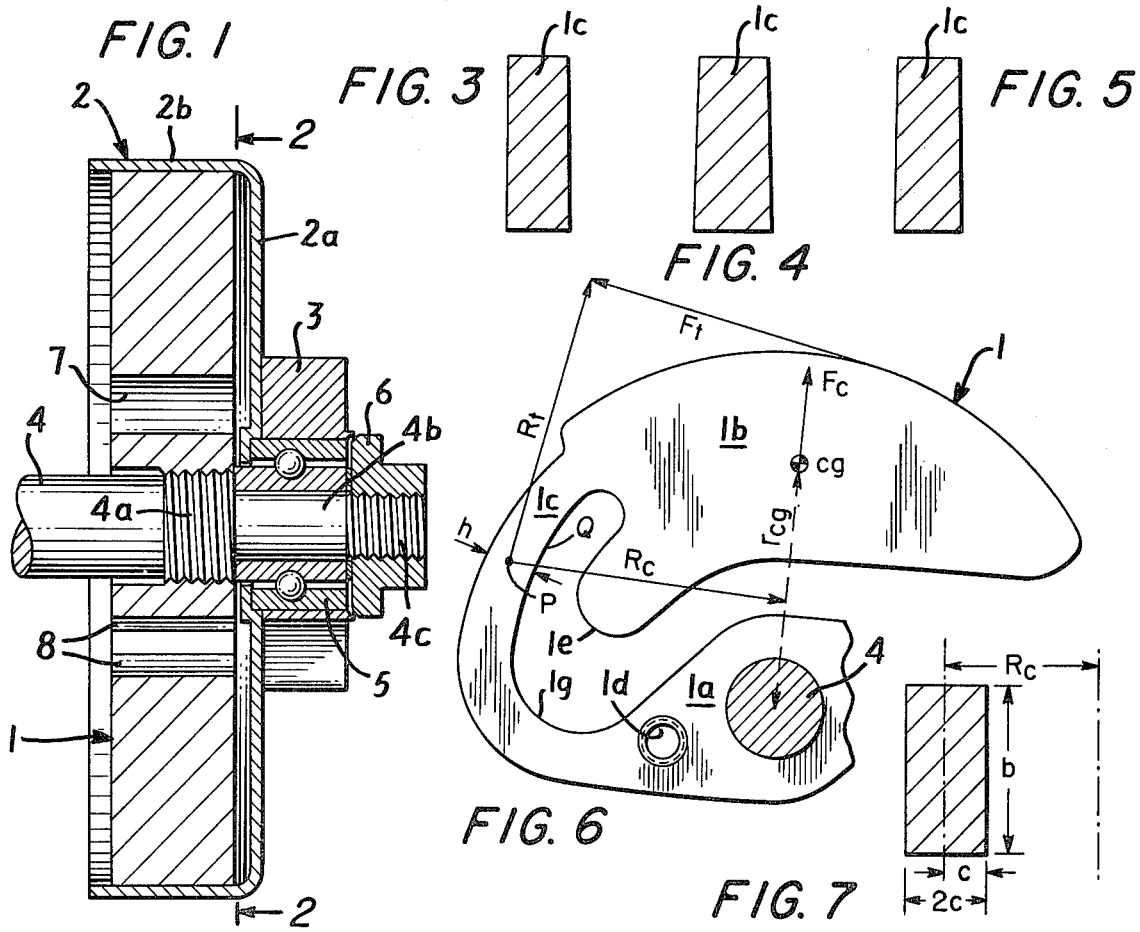

CENTRIFUGAL CLUTCH WITH ONE PIECE ROTOR

REFERENCE TO PRIOR APPLICATION

This application is a continuation-in-part of our co-pending U.S. application Ser. No. 462,179 filed Apr. 18, 1974 and now abandoned.

FIELD OF INVENTION

The present invention relates to a centrifugal clutch for providing a driving connection between a rotary driving member and a rotary driven member when the driving member rotates at or above a critical speed.

BACKGROUND OF INVENTION

Centrifugal clutches are widely used in power tools and other equipment driven by internal combustion engines. For example, as applied to a chain saw, a centrifugal clutch is provided between the engine and a sprocket driving the saw chain. When the engine is running at idling speed, the clutch is disengaged so that the chain is not driven. When the engine speed is increased to a predetermined value the clutch engages to drive the saw chain. This provides convenient control of the chain and also is a safety factor in that the saw chain is not driven when the engine is started and is idling. Moreover, it reduces the starting torque on the engine.

A centrifugal clutch customarily comprises an outer drum and a rotor inside the drum. The rotor constitutes the driving member of the clutch while the drum is the driven member. The rotor usually comprises a hub or body portion at least two weights separte from and movably mounted on the body portion and one or more springs for holding the weights out of engagement with the drum when the rotor is stationary or is rotating at a speed below a selected critical speed. When the speed of rotation of the rotor is increased to a critical valve, the weights are move outwardly by centrifugal force against the action of the spring means so as to engage the drum and thereby provide a driving connection between the drum and the rotor. The manufacture and assembly of the parts comprising the rotor of a centrifugal clutch of this kind involve a considerable amount of expense. By reason of unavoidable manufacturing tolerances in the production of rotor parts it is difficult in commercial production to manufacture clutches of consistently uniform operating characteristics. Moreover, the operating characteristics of an individual clutch may change in use, for example by reason of dirt entering between the moving parts of the clutch rotor.

In U.S. Pat. No. 3,718,214 there is disclosed a centrifugal clutch comprising a clutch drum and a rotor of one piece construction. The rotor comprises a diametrically extending crossbar portion having a hub portion with a central bore, two like weight portions on diametrically opposite sides of the crossbar portion and integral thin spring portions connecting opposite ends of the crossbar portion with the respective weight portions. The one piece rotor construction disclosed in U.S. Pat. No. 3,718,214 represents an important advance over the multiple part construction of earlier centrifugal clutches.

SUMMARY OF THE INVENTION

It is an object of the present invention to provide important improvements in centrifugal clutches having rotors of one piece construction. In one piece rotors, the spring portions connecting the weight portions with the hub characteristically have high spring constants. By reason of this a relatively slight amount of wear between the weight portions and the drum will result in a relatively large change in clutch engagement speed and torque carrying capacity. One piece clutches also have a characteristic problem of spring arm breakage. It is an object of the present invention to overcome both of these problems and to increase the useful life of the clutch.

In accordance with the present invention, the spring arms connecting the weight portions with the hub are made longer and thinner so as to decrease the spring constant of the arms. By reason of this a greater amount of wear between the weight portions and the drum can be tolerated while still maintaining the operating characteristics of the clutch within acceptable limits. Moreover, the geometry of the clutch rotor is changed so that the weight portions engage the drum substantially simultaneously throughout their entire circumferential extent. This not only improves the operating characteristics of the clutch but by distributing the wear of the weight portions over their full peripheral surfaces further increases useful clutch life.

To overcome the problem of spring arm breakage the transverse widths of the arms at continuously successive points along their lengths are selected so as to provide substantially equal fiber stress in the radially innermost surface of the spring arms throughout substantially their entire lengths when the spring arms flex under the action of centrifugal force on the weight portions to bring them into engagement with the inner surface of the drum and are subjected to driving force transmitted through the spring arm portions from the hub to the weight portions and thence to the drum. Concentration of stress and concentration of bending at localized points of the arms leading to metal fatigue and breakage of the arms are thereby avoided. The highest stress levels in the one piece rotor occur along the radially innermost surfaces of the spring arms and control of stress levels along such surfaces leads to a measurable increase in the useful life of the rotor.

BRIEF DESCRIPTION OF DRAWINGS

The nature, objects and advantages of the invention will be more fully understood from the following description of a preferred embodiment of the invention shown by way of example in the drawings in which:

FIG. 1 is an axial cross section of a centrifugal clutch in accordance with the present invention;

FIG. 2 is a transverse section taken approximately on the line 2—2 in FIG. 1;

FIGS. 3, 4 and 5 are respectively cross sections through a spring portion of the clutch rotor taken respectively at the locations indicated by the lines 3—3, 4—4 and 5—5;

FIG. 6 is a partial schematic view of the rotor, and

FIG. 7 is a schematic cross sectional view through a spring portion illustrating calculation of fiber stress.

DESCRIPTION OF PREFERRED EMBODIMENT

A clutch in accordance with the present invention is shown by way of example in the drawings as a centrifugal clutch assembly for a chain saw. The clutch comprises a one piece rotor 1 inside a clutch drum 2. The rotor is of integral construction comprising a hub portion 1a opposite weight portions 1b and spring arm portions 1c connecting the weight portions respectively with the hub. The clutch drum 2 comprises a radial portion 2a and a cylindrical circumferential rim portion 2b. A sprocket 3 for driving the saw chain is disposed centrally on the outside of the radial wall portion 2a of the clutch drum and is united with the clutch drum, for example by welding. The sprocket 3 has a plurality of teeth engageable with inwardly projecting tangs on the saw chain to drive the chain.

The rotor 1 is removably but fixedly mounted on a shaft 4 driven by the engine of the chain saw. For example the shaft 4 may be an extension of the engine crankshaft. As shown by way of example in the drawings, the hub portion of the rotor has a central bore which is internally threaded for about half its length so that the rotor can be screwed onto a threaded portion 4a of the shaft 4. Oppositely disposed holes 1d are provided in the rotor hub to receive a suitable tool for screwing the rotor onto or off of the shaft. The drum-sprocket assembly is rotatably mounted on a cylindrical portion 4b of the shaft 4 by an anti-friction bearing 5 and is retained on the shaft by a nut 6 threaded onto a reduced threaded end portion 4c of the shaft.

The clutch drum 2 is conveniently made from low carbon, soft steel sheet metal by a stamping or drawing operation using suitable dies. A drum having satisfactory manufacturing tolerances can be produced in this manner at low cost. No subsequent grinding or machining operations are required.

The hub portion 1a of the rotor is generally diamond shaped with a major axis extending between the inner ends of the spring portions 1c and a minor axis perpendicular to the major axis. The length of the hub along the major axis is preferably about ½ the outside diameter of the rotor. The width of the hub along the minor axis is approximately ½ the length. Opposite end portions of the hub are tapered and merged smoothly into the inner ends of the spring portions 1c so that there is minimal concentration of stress at the junctions of the spring portions with the hub.

The two weight portions 1b are of identical configuration and are symmetrically disposed on opposite sides of the hub portion 1a except that one is reversed with respect to the other. The weight portions are as large as the geometry of the rotor permits so that centrifugal force acting on the weight portions presses them firmly against the inner surface of the drum when the speed of rotation exceeds a selected value. Thus, for example each weight portion 1b has a radial extent greater than half the radius of the rotor and an angular extend of between 120° and 140° and preferably greater than 130°. As seen in FIG. 2 there are only narrow spaces 7 between the weight portions and the hub and portions 1e of the weight portions extend between the hub portion 1a and spring arm portions 1c of the rotor. The combined weight of the two weight portions is at least 60 percent and preferably 70 to 75 percent of the weight of the rotor. For example each weight portion of a clutch rotor having a diameter of about 3 inches and a weight of 0.74 pounds has a weight of about 0.26 pounds while each weight portion of a rotor having a diameter of about 2.7 inches and a weight of 0.463 pounds has a weight of about 0.17 pounds.

The angular extent of the peripheral surface 1f of the weight portion engageable with the inner surface of the rim portion 2b of the clutch arm is preferably at least 100°. In accordance with the invention, the peripheral surface 1f of each weight portion 1b is arcuate with the same radius as the inner surface of the cylindrical rim portion 2b of the drum. When the rotor is stationary and the weight portions are in retracted position as shown in dotted lines in FIG. 2, the peripheral surfaces 1f of the weight portions are eccentric with respect to the shaft 4. When the rotor is rotating and reaches a selected critical speed, centrifugal force acting on the weight portions causes them to move outwardly by a flexing of the spring arm portions 1c so as to bring the peripheral surface 1f of the weight portions into engagement with the clutch drum. By reason of the geometry of the weight portions and the spring arm portions of the rotor, the peripheral surfaces 1f of the weight portions engage the clutch drum substantially simultaneously throughout their entire lengths. This not only provides optimum operating characteristics of the clutch but assures that any wear of the weight portions of the clutch is uniform so that the peripheral surfaces of the weight portions conform with the inner surface of the clutch drum throughout the useful life of the clutch. Moreover, the area of engagement of the rotor with the drum remains substantially constant at all operating speeds above the critical speed of engagement and throughout the life of the clutch.

The spring arm portions 1c of the rotor have inner end portions which extend approximately radially from diametrically opposite portions of the hub portion 1a, outer end portions which extend approximately circumferentially from the trailing ends of the weight portions 1b and curved intermediate portions connecting the inner end portions with the outer end portions of the spring arm. While the spring arm portions have been shown in the drawing as a composite of discrete arcuate segments, it will be seen that this composite is an approximation of a spiral. Discrete arcuate segments have the advantage of being easily fabricated, but the spring arm portions could similarly be defined as a spiral such as an involute of a circle, a logarithmic, parabolic, hyperbolic or other spiral, or a similar curve of a continuous mathematical function such as an ellipse, parabola, hyperbola or sine curve. The spring arms spiral radially outwardly and circumferentiall forwardly from the hub portion to the weight portion with a progressive increase in the radius of curvature. It will be seen that the outer end portions of the spring arms are spaced radially inwardly from the rim portion of the clutch drum. They accordingly do not engage the drum and are hence not subject to wear. With the geometry shown and described, it is possible to provide relatively long spring arms within the limited space available. Thus, for example the ratio R of the length of the spring arm (measured along the inner side 1g of the arm to the diameter of the clutch when engaged with the drum) is expressed by the relationship.

$$0.4 < R < 0.5$$

By reason of the relatively long lengths, the spring constants of the spring arms is less than it would be for shorter arms. The low spring constant in combination with the relatively heavy weight portions and the conformity of curvature of the peripheral surfaces of the weight portions with the clutch drum makes the clutch less susceptible to changes in engagement and slippage speeds as the interengaging rotor and drum surfaces wear during use. The useful life of the clutch is thereby measurably increased.

In accordance with the invention, the transverse width h of each of the spring arm portions 1c varies at continuously successive points P along their lengths so as to provide substantially equal fiber stress in the radially innermost surface Q of the spring arm portions throughout substantially their entire lengths when the spring portions flex under the action of centrifugal force on the weight portions to bring them into engagement with the inner surface of the drum and are subjected to driving force transmitted through the spring portions from the hub through the weight portions and thence to the drum. The fiber stress sigma at each successive point P along the length of the spring arm portion can be calculated according to the following formula with reference to the schematic views shown in FIGS. 6 and 7 of the drawings. The equations are:

$$(1) \quad \sigma = \frac{M}{2cbR} \left[ 1 - \frac{1}{Z} \frac{c}{(R-c)} \right]$$

where:

$$(2) \quad Z = \frac{R}{2c} \ln\left[\frac{R+c}{R-c}\right] - 1$$

$$(3) \quad M = F_t R_t + F_c R_c$$

$$(4) \quad F_c = \frac{mv^2}{r_{cg}}$$

$$(5) \quad F_t = \frac{T}{2r}$$

$$(6) \quad c = h/2$$

and:

$\sigma$ = sigma, stress of radially innermost fiber of transverse section taken at point P under consideration
$b$ = axial thickness of arm
$c$ = ½ transverse width h of arm
$cg$ = center of gravity of weight portions
$F_c$ = centrifugal force
$F_t$ = tangential driving force
$h$ = transverse width of arm
$ln$ = natural log
$M$ = moment about point P
$m$ = mass of weight portion
$r$ = radius of rotor
$r_{cg}$ = radial distance of cg. of weight portion from axis of rotation
$R$ = radius of curvature of arm at point P
$R_c$ = moment arm of centrifugal force
$R_t$ = moment arm of driving force
$T$ = peak driving torque of engine
$v$ = velocity of weight portion The dimensions and geometry of the spring arm portions are chosen so that the fiber stress sigma at the radially innermost surface of the spring arm portions is substantially uniform throughout the entire length of the spring arm portion and is lower than the fatigue stress or endurance limit of the material of which the rotor is made. The transverse width of the spring arm portion at each successive point P along its length is readily calculated by using the foregoing equations and a computer. By thus designing the spring arm so that the fiber stress is uniform throughout its length, the flexing of the arm is also uniformly distributed. By avoiding localized bending and local stress and by maintaining suitably low stress levels, breakage of the arm by reason of metal fatigue is avoided.

In the example illustrated in the drawings, the spring arm portion, when viewed in an axial direction and proceeding from the hub portion to the weight portion first increases in transverse width $h$ to a maximum value and then decreases in transverse width to the juncture with the weight portion 1b. This arm shape is thus quite different from that of the aforementioned U.S. Pat. No. 3,718,214 which employed a relatively short stubby spring portion which extended in a generally circumferential direction and was tapered with the transverse width decreasing gradually from the hub portion to the juncture with the weight portion. This spring portion was limited in effect due to its short length, monotonically transverse width and relative inflexibility. With the prior construction a relatively small increase in clearance in static condition between the weight portions and drum due to wear in use would result in undesirable increase in clutch engagement speed and decrease in torque carrying capacity. With the configuration in accordance with the present invention providing longer and more flexible spring arm portions, uniform distribution of flexing throughout the length of the spring arm portions and initial conformance of the peripheral contours of the weight portions with the clutch drum, the increase in clearance between the weight portions and drum through wear are insignificant when compared with the original clearance. Hence the clutch performance characteristics remain within acceptable limits throughout a long useful life. Moreover, through maintaining uniform fiber stress of a value below the fatigue stress or endurance limit of the material, premature clutch failure through spring arm breakage is avoided.

The hub portion 1a, weight portions 1b and spring arm portions 1c of the rotor are all preferably of substantially the same thickness in an axial direction so that opposite faces of the rotor lie in parallel planes. The rotor is conveniently manufactured as a single casting comprising the hub portion, weight portions and connecting spring portions. When the rotor is cast, each weight portion is joined with an adjacent portion of the hub by a connection portion 8 of sufficiently large cross section to permit easy flow of metal during casting. The J-shaped spaces 7 between the weight portions, hub and spring portions are formed by suitable mold configuration or by coring. The central bore and the holes 1d may, if desired be formed in like manner. After the rotor has been cast the central bore is tapped and otherwise finished to fit on the shaft 4. The wrench holes 1d are drilled if they have not already been formed in the casting operation. The circumferential surfaces 1f of the weight portions are finished by suitable machining or grinding operation so as to be arcuate with a radius of curvature equal to the inside radius of the drum but with their centers displaced from the central axis of the rotor so that the circumferential surfaces of the weight portions are spaced inwardly from the inner surface of the drum when the rotor is stationary or turning at low speed. As the weight portions move outwardly from static condition by the flexing of the spring arm portions 1c—under the influence of centrifugal force—the incident change in orientation of the weight portions causes their circumferential surfaces to become concentric with the rotor and the drum at the instant of engagement with the drum. As a result, the circumferential surfaces 1f of the weight portions initially engage the drum throughout their circumferential extent. The desired contour of the circumferential surfaces of the weight portions can be obtained by cam grinding the circumference of the rotor while the weight portions are in their innermost position. In this event the connecting portions 8 between the hub are preferably not severed—for example by saw cuts or grinding—until after the circumference of the rotor has been finished. Alternatively, the circumference of the rotor can conveniently be finished by first severing the connecting portions 8 and then grinding the circumferential surface of the rotor while it is rotated at the desired speed of engagement of the clutch. With the rotor thus expanded by centrifugal force, the circumference is ground to provide a cylindrical surface with a radius equal to the radius of the inner surface of the drum. When the rotor is stopped, the weight portions move in the retracted position and the centers of the arcuate circumferential surfaces of the weight portions are thereby shifted to a position displaced from the rotational axis of the rotor as described above. Except for the finishing of the circumferential surface as described, the remaining surfaces of the rotor require no machining or finishing operation and are left "as cast."

The material of which the rotor is cast is a ductile iron allow having an ultimate strength of the order of 130,000 p.s.i. and a modulus of elasticity of the order of 20 million p.s.i. After casting, the rotor is heat treated to provide a Brinell hardness of the order of 311–390. A material suitable for the rotor is an alloy made by Standard Automotive Parts of Muskegon, Michigan which is designated SAE J434A Class D and has approximately the following composition:

| Total Carbon | 3.1 | – | 3.7% |
|---|---|---|---|
| Silicon | 2.2 | – | 2.6% |
| Manganese | .6 | – | .9% |
| Moly | .15 | – | .35% |
| Nickel | .7 | – | 1.0% |
| Remainder Iron | | | |

The material has a density approximately equal to that of cast iron. Moreover, the material is compatible with the soft steel low carbon drum so that it engages the drum smoothly without chattering or galling.

As seen in FIG. 1, the rotor 1 has an axial thickness approximately equal to the axial dimension of the drum so that the interior of the drum is substantially filled by the rotor. The radius of the rotor is such that when the clutch is stationary the circumferential surfaces 1f of the rotor do not engage the circumferential portion 2b of the drum. The term "engage" is herein used to designate engagement with sufficient pressure to produce a driving force between the rotor and drum. Hence, disengagement of the rotor from the drum does not necessarily require complete absence of contact. When the rotor is disengaged from the drum the circumferential surfaces 1f are eccentric with respect to the axis of rotation of the rotor. When the driving shaft 4 and hence the rotor 1 are driven at normal idling speed of the engine, there is no driving contact between the rotor and the drum. When the engine is accelerated to a selected speed, for example 3,500 r.p.m. plus or minus 200 r.p.m., the weight portions 1f of the rotor move outwardly against the resilient restraint of the spring portions 1c so as to engage the drum and cause the drum to rotate with the rotor thereby driving the sprocket 3 and hence the saw chain which runs on the sprocket. The characteristics of the rotor as such as explained above that it engages substantially uniformly at a predetermined critical speed and substantially simultaneously throughout the circumferential extent of the peripheral surfaces 1f. Since the rotor does not involve any sliding or pivoted parts the clutch continues to operate reliably and uniformly throughout its useful life. Moreover, the useful life of the clutch is measurably extended by reason of the characteristics pointed out above.

While a preferred embodiment of the invention has been illustrated in the drawings and is herein particularly described, it will be understood that modifications may be made and hence that the invention is in no way limited to the illustrated embodiment.

What we claim and desire to secure by Letters Patent is:

1. A centrifugal clutch comprising a clutch drum rotatable about an axis and having an inner surface of selected radius and a one piece rotor of resilient material having:
    a. a hub central portion rotatable about an axis concentric with the axis of said drum
    b. means for rotationally driving said hub portion
    c. two like weight portions on diametrically opposite sides of said hub portion and
    d. two like curved spring portions connecting diametrically opposite parts of said hub portion respectively with said weight portions
    e. the dimension of said hub portion measured between points of junction with said spring portions being of the order of 50 to 60 percent the diameter of said drum
    f. said weight portions having radially outer surfaces engageable with said inner surface of the drum and of a radius equal to the radius of the inner surface of the drum, said outer surfaces being disengaged from the inner surface of the drum and being eccentric of the axis of said drum when the rotor is in relaxed condition and so positioned that upon deflection into contact with said drum at a predetermined rotational speed said outer surfaces are concentric with said drum
    g. the ratio of the length of each of said spring portions measured along its radially inner side to the radius of the rotor being of the order of 0.8 to 1.0
    h. said spring portions having first portions extending approximately radially from said hub portion, second portions extending circumferentially rearwardly from said weight portions, said second portions being approximately concentric with the drum axis and spaced radially inward from the inner surface of the drum, and smoothly curved third portions connecting said first and second portions
    i. the transverse width of said spring portions in the plane of rotation of the rotor being of such value at continuously successive points along the lengths of said spring portions as to provide substantially equal fiber stress in the radially innermost surfaces of said spring portions throughout substantially their entire lengths when said spring portions flex under the action of centrifugal force on said weight portions to bring them into engagement with the inner surface of the drum and are subjected to driving force transmitted through said spring portions from said hub to said weight portions and thence to the drums, said fiber stress being lower than the fatigue stress and endurance level of the material of the spring portions.

2. A centrifugal clutch according to claim 1, in which the weight of said weight portions is at least 60° of the total weight of said one piece rotor.

3. A centrifugal clutch according to claim 2, in which the weight of said weight portions is of the order of 70 to 75 percent of the total weight of said one piece rotor.

4. A centrifugal clutch according to claim 1, in which the angular extent of each of said weight portions is of the order of 120° to 140°.

5. A centrifugal clutch according to claim 1, in which the radial extent of each of said weight portions is greater than one half the radius of said rotor when engaging the drum.

6. A centrifugal clutch according to claim 1, in which the annular extent of each of said spring portions is of the order of 65° to 75°.

7. A centrifugal clutch according to claim 1, in which said spring portions spiral radially outwardly and circumferentially forwardly from said hub portion to said weight portions, the longitudinal centerline of each of said spring portions defining substantially the curve of a continuous mathematical function of the group consisting of the involute of a circle, a logarithmic spiral, a parabolic spiral, a hyperbolic spiral, an ellipse, a parabola, a hyperbola and a sine curve.

8. A centrifugal clutch according to claim 7, in which said circumferentially extending portion of each of said arms is approximately half the total length of the arm.

9. A centrifugal clutch according to claim 8, in which said rotor is of approximately uniform thickness in an axial direction.

10. A centrifugal clutch according to claim 7, in which the material of said rotor is a ductile iron alloy having an ultimate strength of the order of 130,000 p.s.i., a modulus of elasticity of the order of 20,000,000 p.s.i. and a Brinell hardness of the order of 311 to 390.

11. A centrifugal clutch according to claim 10, in which said alloy has approximately the following composition by weight:

| | | |
|---|---|---|
| Silicon | 2.2 – | 2.6% |
| Manganese | 0.6 – | 0.9% |
| Molybdenum | 0.15 – | 0.35% |
| Nickel | 0.7 – | 1.0% |
| Total Carbon | 3.1 – | 3.7% |
| Remainder Iron. | | |

* * * * *